United States Patent [15] 3,689,651
Argabright et al. [45] Sept. 5, 1972

[54] TREATMENT OF MAMMALS WITH DI-SUBSTITUTED ISOCYANURIC ACID AND THEIR SALTS

[72] Inventors: Perry A. Argabright, Littleton; Virgel G. Erwin, Boulder; Brian L. Phillips, Littleton, all of Colo.

[73] Assignee: Marathon Oil Company, Findlay, Ohio

[22] Filed: Sept. 2, 1969

[21] Appl. No.: 854,723

[52] U.S. Cl. ............................................. 424/249
[51] Int. Cl. ............................................. A61k 27/00
[58] Field of Search .................. 424/249; 26h/248 HS

[56] References Cited

UNITED STATES PATENTS 3,145,142   8/1964   Lansbury ................... 424/249

OTHER PUBLICATIONS

Speelman et al. J.A.C.S., 73, pp. 1775–1777 (1951).
Close, J.A.C.S., 75, pp. 3617–3618 (1953).
Smolin et al. The Chemistry of Heterocyclic Compounds–S–Triazines and Derivatives (1959). pp 397–399

Primary Examiner—Stanley J. Friedman
Attorney—Joseph C. Herring, Richard C. Willson and Jack L. Hummel

[57] ABSTRACT

Di-substituted isocyanuric acids and their salts have been found highly effective in blocking convulsions in living mammals. Particularly preferred are the lower alkyl di-substituted derivatives of isocyanuric acid and their salts.

21 Claims, No Drawings

TREATMENT OF MAMMALS WITH DI-SUBSTITUTED ISOCYANURIC ACID AND THEIR SALTS

CROSS REFERENCES TO RELATED APPLICATIONS

No related United States patent applications are known to the inventors.

BACKGROUND OF THE INVENTION

1. Field of the Invention

The present invention relates to new methods for the treatment of convulsions and provides new central nervous system depressants.

2. Description of the Prior Art

Isocyanuric acids and their derivatives are taught in a number of United States Pats. Nos. 3,325,287, 3,072,654; 3,278,492; 3,150,132; 3,367,934; 3,144,452; 2,580,468; 2,536,849; and 3,145,142. The latter patent teaches the use of 1,3,5-trimethyl-s-triazine-2-4-6- (1H, 3H, 5H) trione as an anticonvulsant. Alkyl esters of cyanuric acid were found to be anticonvulsant drugs as reported in 73 JACS 1775–7. Some 1-substituted biurets have been shown to be effective against some electro shock-induced convulsions and ineffective against some chemically-induced convulsions as reported in 75 JACS 3615–3620, and others found to be more effective against certain chemically-induced convulsions as reported in 73 JACS 1775–1777. Mono-substituted isocyanurates were found to have some anticonvulsant action..."but none was outstanding" in 75 JACS 3617–3620. Anticonsulvant drugs generally have been discussed in the "Textbook of Organic Medicinal and Pharmaceutical Chemistry" 5th edition, J. B. Lippincott Co., Philadelphia, 1966 p. 402–409; in 28 Physiological Reviews 409–432, in 26 Proceedings of Association for Research in Nervous and Mental Disease 141–163, in Vol. 11, 2nd ed. encyclopedia of Chemical Technology, Kirk and Othmer; in 10 Texas Reports on Biology and Medicine 96–104, and in Research Reviews of Research in Nervous and Mental Disorders (1946) Chapter X, pp 141–163.

To applicants's knowledge, all of the present therapeutically utilized anticonvulsants, i.e. hydantoins, oxazolidine-2,4-diones, succinimides, and barbiturates, etc. contain the "ureido" pharmacophoric grouping,

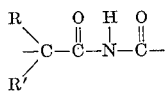

Hydantoin derivatives are effective only in the treatment of grand mall epilepsy, that is, they block electroshock-induced convulsions only. Oxazolidine-2,4-dione derivatives are primarily effective in petit mall epilepsy, that is, they block chemically-induced convulsions. The anticonvulsants of the present invention are notable in that they do not contain the ureido pharmacophoric grouping, but do possess substantial anticonvulsant activity.

The currently available anticonvulsants have certain serious limitations. For example, at dosages only slightly above the effective anticonvulsant levels, Dilantin (Parke Davis'tradename for diphenyl hydantoin) can produce neurotoxic effects and phenobarbital can produce marked central nervous system depression. The di-substituted isocyanuric acids and derivatives of the present invention are shown to be relatively nontoxic in acute experiments, i.e. the $LD_{50}$ in rats ranges from approximately 350 mg per Kg to over 2.0 gm per Kg bodyweight leading to unusually high therapeutic indices (T. I.).

$$T.I. = \frac{LD_{50} \text{ (Lethal Dose)}}{ED_{50} \text{ (Effective Dose)}}$$

SUMMARY

GENERAL STATEMENT OF THE INVENTION

Di-substituted isocyanuric acids and their salts have been found to be unique anticonvulsants exhibiting efficacy primarily against chemically-induced convulsions with little or no deleterious side effects.

The compositions of the invention are potent, relatively nontoxic, anticonvulsants effective against chemically induced convulsions. This distinguishes them from Dilantin (Parke Davis'tradename for diphenyl hydantoin).

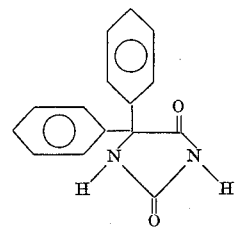

which is effective in blocking only those convulsions induced by electroshock. The disubstituted isocyanuric acids and their salts, particularly the lower alkyl derivatives, are as potent as phenobarbital (one of the most potent currently available drugs) in preventing Metrazol-induced convulsions, (Metrazol is Knoll's trademark for pentylene tetrazol) and exhibit some lesser efficiency against seizures induced by electroshock. Further, at comparable dosages, the preferred compositions of the present invention produce substantially less central nervous system depression than does phenobarbital. The high potency and minimal side effects of the di-substituted isocyanuric acids and salts of the present invention contrast sharply with the low potency and pronounced side effects of both the mono- and the tri-substituted isocyanuric acids and derivatives shown in the comparative examples. In certain instances the products of the invention can be applied in treatment of chlorinated hydrocarbon, e.g. DDT, concentrations in mammals.

Particularly preferred compounds of the present invention are those having the formula:

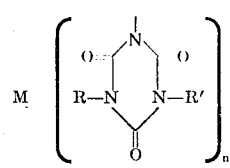

where R and R' may be the same or different, and preferably contain from one to 30, more preferably from one to 20, and most preferably from one to six carbon atoms and are preferably both selected from the following group: monovalent hydrocarbon radicals; monovalent hydrocarbon radicals substituted with cyano groups, nitro groups, alkoxy groups, thiyl groups, halo groups, carboxylate groups, carboxylate ester groups hydroxyl groups, heterocyclic ring groups, amide groups, ether groups, thioether groups, amino groups, sulfone groups, sulfoxide groups, disulfide groups, phosphate groups, keto groups, and aldehyde groups. More preferably, R and R' are selected from the class consisting of: alkyl groups, e.g. methyl and hexyl aralkyl groups, e.g. benzyl and alpha-naphthyl methyl, alkaryl, e.g. p-tolyl and meta-isopropyl phenyl, alicyclic (e.g. cyclohexyl, cyclopropyl), alkenyl, e.g. vinyl, allyl, alkynyl, e.g. ethynyl, propargyl, 1-propynl, and derivatives of the foregoing which are substituted with cyano groups, nitro groups, alkoxy groups, thiyl groups, carboxylate groups, carboxylate ester groups, hydroxyl groups, heterocyclic groups, amide groups, ether groups, thioether groups, amino groups, sulfone groups, sulfoxide groups, disulfide groups, phosphate groups, keto groups, and aldehyde groups. R and R' can contain unsaturation or can be saturated.

Still more preferred are R and R' groups selected from the class consisting of alkyl groups, aralkyl groups, and alicyclic groups. Most preferred R and R's are selected from the lower alkyl groups containing from one to six carbon atoms. Especially preferred are straight-chain lower alkyl groups and the most preferred R and R' are methyl groups.

$n$ is the oxidation number of M and is an integer from 1 to about 6, preferably 1 to 3, most preferably 1.

M is a cation which can be hydrogen, metal, quaternary cations (e.g. ammonium, tetraalkyl ammonium, sulfonium phosphonium, or other cation which must be pharmacologically acceptable. More preferred M's are selected from group consisting of hydrogen, alkali metals, and quarternary groups. M must be selected so as not to impede the transport into the body mechanism and must, of course, not cause side reactions or substantial side effects.

Most preferably, M is selected from the group consisting of hydrogen, lithium, sodium, and potassium. Mixtures of the above-mentioned compounds can, of course, be employed if desired.

Utility of the Invention

While the invention is particularly preferred for the treatment of chemically-induced or psychomotor convulsions, it can also be used, in higher dosage levels, as a central nervous system depressant. While applicable to treatment of the whole range of mammals, treatment of humans will be preferred.

DESCRIPTION OF THE PREFERRED EMBODIMENTS

Starting materials

The di-substituted isocyanuric acids and their salts can be produced by several methods. For example, (a) acid hydrolysis of diiminotriazines according to B. Rathke in 20 Berichte 1070 (1887 ); (b) by alkylation of cyanurate salts according to J. Pomomarew in 18 Berichte 3261 (1885); (c) by pyrolysis of mono-substituted ureas according to Slotta and Tschesche in 60 Berichte 301 (1927). Also applicable are the techniques of Italian patent applications 20,451 A/68, 839511 and Canadian patent application 26,214.

Form of Administration

The compounds of the present invention may be administered by injection or because of their good stability in gastric juice, may be taken orally in the form of a soft or hard gelatin capsule, hard or soft tablets, elixir, pharmaceutical mucilage, oral suspension, emulsion or syrup, with or without artificial flavoring, coloring, tinctures, spirits, or other adjuvants if desired. Tablets, capsules and injectable dosage forms containing one daily dosage (as discussed below) are particularly preferred.

Liquid Formulations

The liquid formulations in which the di-substituted isocyanuric acids or salts are administered will preferably have a pH of from 6.0 to about 9.0, more preferably from about 7.0 to about 8.5, and most preferably from about 7.5 to about 8.2. Buffering to the desired pH range, e.g. by phosphate buffers such as sodium phosphate, is particularly preferred.

Specific vehicles, including aromatic elixir, U.S.P.; simple elixir, U.S.P.; Acacia Mucilage, Tragacanth Mucilage, N.F.; wild cherry syrup, U.S.P. can be used for oral liquid administration. Hard or soft tablets may be formulated with talc or starch or other standard binders and excipients. Injectable formulations may be made using sterile aqueous solutions, preferably buffered conventional vehicles of many types to be found in the National Formulary or United States Pharmacopeia. If desired, any formulations may contain conventional anticonvulsants or other medicants as well as the compounds of the present invention. Especially preferred are injectable liquid compositions containing from about 0.5 to about 30, more preferably 0.75 to 10, and most preferably form 1 to 5 percent by weight di-substituted isocyanuric acids or their salts dissolved in an injectable pharmaceutical vehicle. Sterile packages containing about 0.25 to 5.0, more preferably 0.5 to 3.0, and most preferably 1 to 2 cubic centimeters of such injectable compositions are especially convenient.

Dosage Levels:

While the dosage level will vary somewhat in accordance with the severity and frequency of the convulsive seizures being treated, the specific compound being administered, and the route of administration, in general the dosage will preferably be from about 0.2 to about 500, more preferably from about 0.5 to about 100, and most preferably from 1.0 to about 50 mg per Kg of body weight.

In administration to a human who is subject to convulsive seizures, the compositions of the invention can be administered in daily dosages of from 20 to about 2,000, more preferably 50 to 100 milligrams in single or multiple dosages as indicated. The particular dosage for given circumstance will readily be selected by persons skilled in the art in accordance with the experimental results and the discussions set forth in the present application.

The compositions administered are, of course, to be sterile and nontoxic. Sterilization can be routinely accomplished by a temperature of about 120°C in an autoclave at about one atmosphere pressure for from about 5 to 20 minutes, or alternatively can be accomplished by the use of a bacterial filter. Sterilization can be conveniently accomplished simultaneously with the dissolving or suspending of the active ingredients into the pharmaceutical carrier.

In general, the vehicle will be mixed with the active ingredients at a temperature of from 0 to about 120°C, more preferably form 15 to about 80°C, and most preferably 20° to 30°C. Where suspensions or emulsions are to be formed conventional techniques may be employed.

listed in Table 1 in a minimal amount of 10% sodium hydroxide and adjusting the pH of the solution to 7.8 or 9.0 as indicated, with 0.1 M phosphate buffer (Tween 80, a non-ionic pharmaceutically-acceptable surface active agent manufactured by Atlas Pharmaceutical Labs. Inc. of Detroit was employed for compounds that were insoluble in water under the conditions of the final buffered solution.) All solutions and suspensions are injected intraperitoneally and control rats which received the respective diluents are convulsed. Adult Sprague-Dawley rats of either sex weighing approximately 250 gm were used in these experiments.

TABLE 1

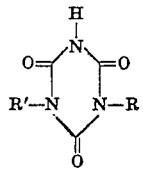

and salts as anticonvulsants

| Example | R = R' | Approx. pH | Dosage, mg./kg. | Anticonvulsant action* Metrazol shock | Anticonvulsant action* Electro shock | Side effects |
|---|---|---|---|---|---|---|
| 1 | $CH_3-$ | 7.8 | 25 | ++− | ±±± | None. |
| 2 | $CH_3-$ | 7.8 | 50 | +++ | ±++ | Do. |
| 3 | $CH_3-$ | 7.8 | 100 | +++ | +++ | Do. |
| 4 | $CH_3-$ | 7.8 | 600 | +++ | +++ | None. |
| 5 | $n-C_3H_7-$ | 7.8 | 25 | +−− | ++± | None. |
| 6 | $n-C_3H_7-$ | 7.8 | 50 | +++ | +++ | Slight sedation. |
| 7 | $n-C_3H_7-$ | 7.8 | 100 | +++ | +++ | Marked sedation. |
| 8 | $n-C_4H_9-$ | 9.0 | 25 | ++++++ | ++++++ | None. |
| 9 | $n-C_4H_9-$ | 9.0 | 50 | ++++++ | ++++++ | Slight sedation. |
| 10 | $CH_2=CH-CH_2-$ | 9.0 | 50 | −−−−−− | ±±±+−− | Sedation. |
| 11 | $CH_2=CH-CH_2-$ | 9.0 | 100 | ++++++ | ++++++ | Complete sedation. |
| 12 | $CH_2=CH-CH_2-$ | 9.0 | 200 | ±±±−−− | ±±± | Slight sedation. |
| 13 | $CH_3O-\langle O \rangle-$ | 7.8 | 200 | +±− | | Do. |
| 14 | (naphthyl) | 7.8 | 200 | +±± | | Do. |
| Comparative | Phenobarbitol | 7.8 | 25 | === | | Do. |
| Comparative | do | 7.8 | 50 | ++++++ | ++++++ | Moderate sedation. |
| Comparative | Dilantin | 7.8 | 50 | −−−−−− | ++++++ | |

*The rats were given 50 mg./kg. Metrazol to induce convulsions or convulsions were induced by supra maximal electroshock (150 mamps., 0.5 millisec. duration, at a frequency of 50 per second for 5 seconds). If the compounds prevented the clonic convulsions produced by Metrazol or the tonic hind-limp extension caused by electroshock, they were said to be completely protective. In the electroshock procedure corneal electrodes were taped to the cornea of the animal with pledgets of cotton saturated with an electrolyte solution for efficient impulse conduction. In all cases: "−" refers to convulsions or no protection; "+" refers to no convulsions or complete protection; and "±" refers to partial protection against convulsions. In all electroshock tests described in this application, the animals were manually restrained, a technique which it has since been learned may not provide reproducible results. In Table 1 results are given for each animal tested for each type of compound and each type of shock.

Examples

EXAMPLES 1–14

According to the invention, anticonvulsant drug formulations were prepared from di-substituted isocyanuric acids and derivatives by dissolving the compounds

EXAMPLE 15

When various compounds having the general structure shown in Table 1, in which the R and R' are selected from those listed in Table 1, but in which R is different from R' in each compound, utilizing procedures similar to those of Examples 1 through 14; the results are similar to those obtained using the similar compounds in which the R and R' are the same.

EXAMPLE 16

Significant anti-convulsant activity is noted for each of the compounds, when similar procedures and dosage levels are followed, utilizing compounds having the general structure of those of the Table 1, but having R and R' groups containing one–30 carbon atoms as follows: methyl, hexyl, benzyl alpha naphthyl methyl, tolyl, meta isopropyl phenyl, cyclohexyl, cyclopropyl, vinyl, allyl, ethynyl, and propynl.

EXAMPLE 17

When each of the compounds of the preceding examples is substituted on the R and R' group with the following radicals: cyano groups, nitro groups, alkoxy groups, thiyl groups, halo groups, carboxylate groups, carboxylate ester groups, hydroxyl groups, heterocyclic ring groups, amide groups, ether groups, thioether groups, amino groups, sulfone groups, sulfoxide groups, disulfide groups, phosphate groups, keto groups, aldehyde groups, and combination of the foregoing groups, significant anticonvulsive activity is exhibited by each compound.

EXAMPLE 18

When the compounds of the preceding examples are prepared as described in those examples, and administered to humans experiencing convulsive seizures significant anticonvulsant activity is obtained.

EXAMPLE 19

When the compounds of the preceding examples are compounded into tablets using, as solid fillers: lactose, talc, stearic acid, magnesium stearate, and starch and administered orally in the doses used in the preceding examples, similar results are obtained.

EXAMPLE 20

When the compounds of the preceding examples are formulated into oral suspensions using tragacanth mucilage and syrups using cinnamon syrup, N.F. and administered orally in the dosages listed in the above examples, similar results are obtained.

EXAMPLE 21

When the compositions of the preceding examples are formulated using hydroxides of the following cations, in place of sodium hydroxide, similar results are obtained at similar dosages using similar formulation and administration techniques: lithium, potassium, ammonium, tetraalkyl-ammonium, -sulfonium, -phosphonium.

EXAMPLES 22 THROUGH 26

When di-substituted isocyanuric acids and derivatives were prepared and injected as described on Example 1 using at least four different dosage levels and using six mice per dosage of each of the compounds, significant anticonvulsant activity is indicated and the $LD_{50}$ for each compound is found to be as shown in Table 2:

TABLE 2

| Ex. | Isocyanurate | $LD_{50}$ (mg/Kg) | Approximate Therapeutic Index |
|---|---|---|---|
| 22 | dimethyl | >600 mg/Kg | >24 |
| 23 | di-n-butyl- | 350 | 14 |
| 24 | diallyl- | 700–800 | 7–8 |
| 25 | diphenyl- | >2000 | approx. 10 |
| 26 | dilantin | 125* | 5 |

* $LD_{50}$ IV rabbits (Merck Index 7th ed.)

EXAMPLE 27

The following example, using the techniques of Examples 1–14, demonstrates the low potency and acute toxicity of cyanuric acid as an anticonvulsant:

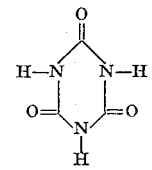

as an anticonvulsant

| Dosage, mg/Kg | Anticonvulsant Action (Metrazol Induced) | Side Effect |
|---|---|---|
| 25 | — | Slight sedation |
| 50 | ± | Moderate sedation |
| 100 | + | Marked sedation |

EXAMPLE 28

This example, using the techniques of Examples 1–14, is set forth to demonstrate the ineffectiveness of mono-substituted isocyanuric acids (salts) as anticonvulsants. n-Propyl isocyanuric acid is chosen for comparison as it was the most promising compound discussed by W. J. Close (J. Am. Chem. Soc., 75, 3618 (1953)

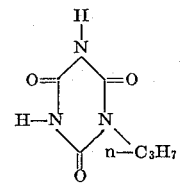

as an anticonvulsant

| Dosage, mg/Kg | Anticonsulvant Action Metrazol shock | Electro shock | Side Effects |
|---|---|---|---|
| 25 | — | — | Slight sedation labored breathing |
| 50 | — | — | Moderate sedation with ataxia |
| 100 | — |  | Ataxia diarrhea |
| 200 | + | + | Marked Sedation diarrhea |

+complete protection
±moderate protection
—no protection

EXAMPLES 29 AND 30

The following examples, using the techniques of Examples 1–14, (except that insolubility required aqueous suspensions in 5 percent Tween 80, a nonionic pharmaceutically effective surfactant manufactured by Atlas Pharmaceutical Labs. of Detroit) are set forth to demonstrate the ineffectiveness of trisubstituted isocyanurates as anticonvulsants:

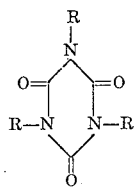

as anticonvulsants

| Ex. | R | Dosage, mg/Kg | Anticonvulsant Action Metrazol induced | Side Effects |
|---|---|---|---|---|
| 29 | $CH_3$ | 50 | — | Slight sedation |
| 30 | $CH_3$ | 200 | ++± | Marked sedation & diarrhea |

What is claimed is:

1. A method of temporarily alleviating convulsions in a mammal which comprises the administration to a living mammal of an effective amount of a di-substituted isocyanuric acid or its pharmacalogically-acceptable salt thereof wherein the substituents are selected form the group consisting of: lower alkyl, benzyl and alpha-naphthyl methyl, p-tolyl and meta-isopropyl phenyl, cyclohexyl, cyclopropyl, vinyl, allyl, ethynyl, propargyl, and 1-propynl.

2. A therapeutic composition for alleviating convulsions in a mammal in dosage form comprising an orally administratable pharmaceutical vehicle bland to the gastric mucosa, mixed with an effective amount of a member of the group consisting of a di-substituted isocyanuric acid and its pharmacologically-acceptable salt thereof wherein the substituents are selected from the group consisting of: lower alkyl, benzyl and alpha-napthyl methyl, p-tolyl and meta-isopropyl phenyl, cyclohexyl, cyclopropyl, vinyl, allyl, ethynyl, propargyl, and 1-propynl.

3. An injectable liquid composition for administration to mammals for controlling or preventing convulsions comprising from about 0.5 to about 30 percent by weight di-substituted isocyanuric acid or a salt thereof, wherein the substituents are selected from the group consisting of: lower alkyl, benzyl and alpha-napthyl methyl, p-tolyl and meta-isopropyl phenyl, cyclohexyl, cyclopropyl, vinyl, allyl, ethynyl, propargyl, and 1-propynl, dissolved in an injectable pharmaceutical vehicle, said composition having a pH of from 7.5 to about 8.2.

4. A process for the treatment of a mammal suffering from chronic convulsions which consists of administering to a living mammal a compound having the structure:

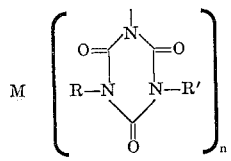

in which R and R' may be the same or different and are monovalent radicals selected from the group consisting of: lower alkyl, benzyl and alpha-napthyl methyl, p-tolyl and meta-isopropyl phenyl, cyclohexyl, cyclopropyl, vinyl, allyl, ethynyl, propargyl, and 1-propynl.

5. The method of claim 1 in which there is administered to living mammals di-hydrocarbon substituted isocyanuric acid or an alkali metal salt thereof or a quaternary salt thereof.

6. The method of claim 1 in which the di-substituted isocyanuric acid or the pharmacologically-acceptable salt thereof is administered in a dosage level of from about 0.2 to about 500 mg per Kg of body weight of the mammal.

7. The method of claim 1 wherein di-lower alkyl-substituted isocyanuric acid or the alkali metal or ammonium salt thereof is administered to mammals in a dosage level of from about 0.2 to about 500 mg per Kg of body weight of the mammal.

8. The method of claim 1 wherein dimethyl isocyanuric acid or an alkali metal salt or ammonium salt thereof is administered in a dosage level of from about 0.2 to about 500 mg per Kg of body weight of the mammal.

9. The composition of claim 2 in which the dosage form is a tablet containing a dosage of from about 20 to about 2,000 mg of the di-substituted isocyanuric acid or its pharmacologically-acceptable salt.

10. A tablet of claim 9 containing from 50 to 100 mg of a di-hydrocarbon-substituted isocyanuric acid, its alkali metal salt or its quaternary salt.

11. A tablet of claim 10 containing from 50 to 100 mg of di-lower alkyl substituted isocyanuric acid or its alkali metal or ammonium salt.

12. A tablet of claim 11 containing from 50 to 100 mg of dimethyl isocyanuric acid or its alkali metal or ammonium salt.

13. A sterile package containing about 0.25 to 5.0 cubic centimeters of an injectable liquid composition according to claim 3.

14. Compositions according to claim 3 containing from about 0.75 to 10 percent by weight of di-hydrocarbon substituted isocyanuric acids or their alkali metal or quaternary salt.

15. A sterile package containing about 0.25 to 5.0 cubic centimeters of an injectable liquid composition according to claim 14.

16. A process according to claim 4 in which the R and R' are hydrocarbon groups.

17. A process according to claim 4 wherein R and R' are lower alkyl radicals and wherein M is selected from the group consisting of hydrogen, alkali metal and ammonium.

18. The process of claim 4 wherein R and R' are lower alkyl groups, at least one of which is substituted with at least one member selected from the group consisting of cyano, nitro, alkoxy, carboxylate, carboxylate ester, hydroxyl, amides, ethers, amino and phosphates and wherein M is selected from the group consisting of hydrogen, alkali metal and ammonium.

19. The process of claim 18 wherein R and R' are both methyl groups.

20. The process of claim 4 wherein the dosage level of said di-substituted isocyanuric acid or its salt is from about 0.2 to about 500 mg per Kg of body weight of the mammal.

21. The process of claim 18 wherein the dosage level of said isocyanuric acid or its salt is from about 0.5 to about 100 mg per Kg of body weight of the mammal.

* * * * *